US012437622B2

(12) United States Patent
Mott et al.

(10) Patent No.: US 12,437,622 B2
(45) Date of Patent: Oct. 7, 2025

(54) SMOKE ALARM WITH OFFSET DETECTION CHAMBER AND SHIELD

(71) Applicant: Carrier Corporation, Palm Beach Gardens, FL (US)

(72) Inventors: Kenneth J. Mott, Colorado Springs, CO (US); Peter R. Bushnell, Cazenovia, NY (US); Jennifer Alexander, Minneapolis, MN (US); Peter R. Harris, Jupiter, FL (US); Daniel Asselin, Syracuse, NY (US); Ahmed Hasan, Indianapolis, IN (US)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 233 days.

(21) Appl. No.: 18/178,007

(22) Filed: Mar. 3, 2023

(65) Prior Publication Data

US 2023/0290238 A1 Sep. 14, 2023

Related U.S. Application Data

(60) Provisional application No. 63/316,771, filed on Mar. 4, 2022.

(51) Int. Cl.
*G08B 17/107* (2006.01)

(52) U.S. Cl.
CPC .................................. *G08B 17/107* (2013.01)

(58) Field of Classification Search
None
See application file for complete search history.

(56) References Cited

U.S. PATENT DOCUMENTS

| | | | |
|---|---|---|---|
| 5,021,677 | A | 6/1991 | Igarashi et al. |
| 5,751,218 | A | 5/1998 | Winterble et al. |
| 6,737,977 | B2 | 5/2004 | Nishikawa et al. |
| 6,756,905 | B2 | 6/2004 | Rattman et al. |
| 6,778,091 | B2 | 8/2004 | Qualey, III et al. |
| 6,914,535 | B2 | 7/2005 | Matsukuma et al. |
| 7,034,702 | B2 | 4/2006 | Thomas et al. |
| 7,365,846 | B2 | 4/2008 | Hess et al. |
| 7,463,159 | B2 | 12/2008 | Hiess et al. |
| 7,616,126 | B2 | 11/2009 | Kadwell et al. |

(Continued)

FOREIGN PATENT DOCUMENTS

| | | |
|---|---|---|
| CN | 100557418 C | 11/2009 |
| CN | 101546465 B | 3/2011 |

(Continued)

OTHER PUBLICATIONS

Extended European Search Report for European Application No. 23160025.5; Report Mail Date Jul. 27, 2023 (7 Pages).

*Primary Examiner* — K. Wong
(74) *Attorney, Agent, or Firm* — CANTOR COLBURN LLP

(57) ABSTRACT

A smoke alarm includes a housing having a generally hollow interior, a printed circuit board arranged within the interior of the housing, and an optical chamber assembly connected to the printed circuit board. The optical chamber assembly has an interior chamber and at least one smoke entry location. A substantial entirety of the interior chamber is external to the housing. At least one light device for evaluating particles is arranged within an interior chamber of the optical chamber assembly.

12 Claims, 8 Drawing Sheets

(56) References Cited

U.S. PATENT DOCUMENTS

| | | | |
|---|---|---|---|
| 8,106,784 | B2 | 1/2012 | Katou et al. |
| 8,232,885 | B2 | 7/2012 | Hoshino et al. |
| 8,816,867 | B2 | 8/2014 | Mammoto et al. |
| 9,824,564 | B2 | 11/2017 | Bressanutti et al. |
| 9,836,937 | B2 | 12/2017 | Kawaguchi et al. |
| 10,024,782 | B2 | 7/2018 | Lo |
| 10,282,956 | B2 | 5/2019 | Stibich et al. |
| 11,074,796 | B2 | 7/2021 | Gadonniex et al. |
| 2020/0388127 | A1 | 12/2020 | Lee et al. |
| 2021/0074136 | A1 | 3/2021 | Mott et al. |
| 2021/0233374 | A1 | 7/2021 | Walker et al. |
| 2021/0295667 | A1 | 9/2021 | Zu et al. |

FOREIGN PATENT DOCUMENTS

| | | | | | |
|---|---|---|---|---|---|
| CN | 203673614 | U | | 6/2014 | |
| CN | 206147885 | U | | 5/2017 | |
| CN | 107516396 | A | | 12/2017 | |
| CN | 108106978 | A | | 6/2018 | |
| CN | 109448305 | A | | 3/2019 | |
| CN | 209103484 | U | | 7/2019 | |
| CN | 209168358 | U | | 7/2019 | |
| CN | 209460904 | U | | 10/2019 | |
| CN | 209674495 | U | | 11/2019 | |
| CN | 209803962 | U | | 12/2019 | |
| CN | 210515594 | U | | 5/2020 | |
| CN | 212009806 | U | | 11/2020 | |
| CN | 212009807 | U | | 11/2020 | |
| CN | 213241409 | U | | 5/2021 | |
| CN | 113066253 | A | | 7/2021 | |
| CN | 113268752 | A | * | 8/2021 | ........... G06F 21/602 |
| CN | 214226086 | U | | 9/2021 | |
| CN | 112785808 | A | | 11/2021 | |
| EP | 1253566 | A2 | | 10/2002 | |
| EP | 1903524 | B1 | | 11/2009 | |
| EP | 2395489 | A2 | * | 12/2011 | ........... G08B 17/107 |
| EP | 2685437 | A1 | | 1/2014 | |
| EP | 2908301 | A1 | * | 8/2015 | ........... G08B 17/107 |
| EP | 3424029 | B1 | | 3/2017 | |
| EP | 3514775 | B1 | | 8/2017 | |
| EP | 2402920 | B1 | | 9/2018 | |
| EP | 3514774 | A1 | | 7/2019 | |
| EP | 2614494 | B1 | | 1/2020 | |
| EP | 3779910 | A1 | | 2/2021 | |
| HU | 226178 | B1 | * | 6/2008 | ........... G08B 17/107 |

* cited by examiner

SMOKE ALARM WITH OFFSET DETECTION CHAMBER AND SHIELD

CROSS-REFERENCE TO RELATED APPLICATIONS

This application claims the benefit of U.S. Application No. 63/316,771, filed Mar. 4, 2022, the contents of which are incorporated by reference herein in their entirety.

BACKGROUND

Embodiments disclosed herein relate to a smoke alarm and, more particularly, to a photo-electric smoke alarm using multiple light emitters and receivers.

A smoke alarm or alarm is operable to detect smoke and issue an alarm in response thereto. A photoelectric smoke alarm, meanwhile, is a type of smoke alarm emitter including a light receiver and an optic chamber. When there is no smoke in the optic chamber, the light receiver typically receives a small amount of light reflected from chamber surfaces. On the other hand, when smoke is present in the optic chamber, more light is received at the light receiver due to light being reflected from the smoke particles. When the amount of the received light exceeds a predetermined level, an alarm is triggered.

Existing residential smoke alarms have various components surrounding the optic chamber which can inhibit the flow of smoke into the optic chamber. Accordingly, there is a need for a smoke alarm that allows for an increased smoke flow into the optic chamber.

BRIEF DESCRIPTION

According to an embodiment, a smoke alarm includes a housing having a generally hollow interior, a printed circuit board arranged within the interior of the housing, and an optical chamber assembly connected to the printed circuit board. The optical chamber assembly has an interior chamber and at least one smoke entry location. A substantial entirety of the interior chamber is external to the housing. At least one light device for evaluating particles is arranged within an interior chamber of the optical chamber assembly.

In addition to one or more of the features described herein, or as an alternative, in further embodiments the at least one smoke entry location is a single smoke entry location.

In addition to one or more of the features described herein, or as an alternative, in further embodiments the single smoke entry location being formed about a periphery of the optical cover.

In addition to one or more of the features described herein, or as an alternative, in further embodiments the optical chamber assembly further comprises an optical cover defining the interior chamber of the optical chamber assembly.

In addition to one or more of the features described herein, or as an alternative, in further embodiments the optical cover further comprises an end piece and a plurality of side members extending from the end piece, wherein a portion of the plurality of side members arranged external to the housing forms the single smoke entry location.

In addition to one or more of the features described herein, or as an alternative, in further embodiments the at least one light device is mounted external to the internal chamber.

In addition to one or more of the features described herein, or as an alternative, in further embodiments comprising a shield having a body, the body being offset from the housing, wherein the shield is mounted in overlapping arrangement with the smoke entry location.

In addition to one or more of the features described herein, or as an alternative, in further embodiments at least one dimension of the body is larger than a corresponding dimension of the optical cover.

In addition to one or more of the features described herein, or as an alternative, in further embodiments the body is curved about a first axis, the first axis extending substantially perpendicular to an axis extending through the optical chamber assembly and the optical cover.

In addition to one or more of the features described herein, or as an alternative, in further embodiments the body is curved about a second axis, the second axis extending substantially perpendicular to the first axis.

In addition to one or more of the features described herein, or as an alternative, in further embodiments the shield further comprises a plurality of supports extending from the body and connected to the housing, wherein a configuration of the plurality of supports is selected to minimize interference with a flow toward the smoke entry location.

In addition to one or more of the features described herein, or as an alternative, in further embodiments a groove is formed in a surface of the housing facing an area to be monitored.

In addition to one or more of the features described herein, or as an alternative, in further embodiments the housing has a substantially solid sidewall.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
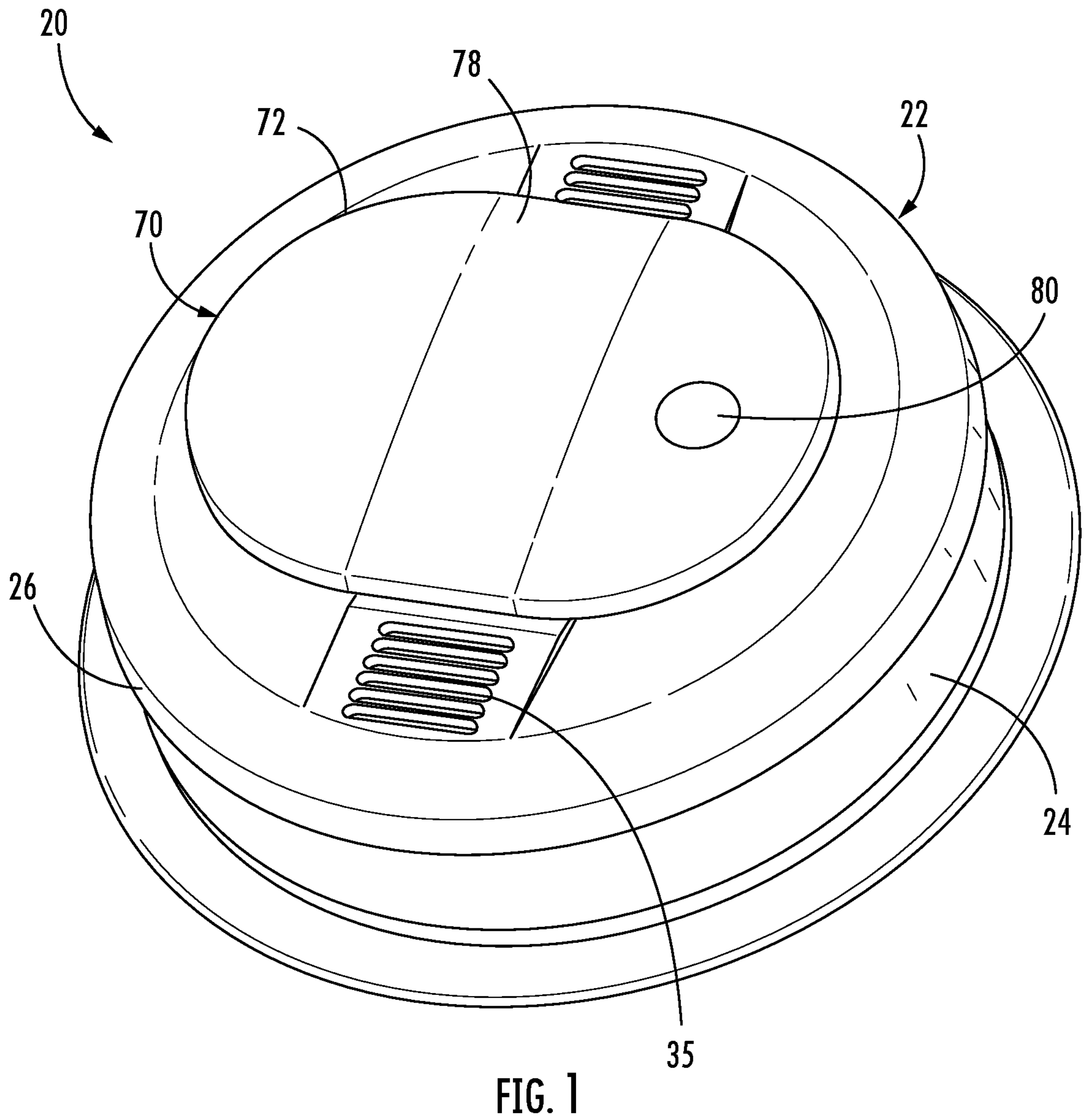
FIG. 1 is a perspective view of an exemplary smoke alarm according to an embodiment.

A detailed description of one or more embodiments of the disclosed apparatus and method are presented herein by way of exemplification and not limitation with reference to the Figures.

With reference now to FIGS. 1-5, various exemplary smoke alarms 20, such as photo-electric smoke alarms or alarms for example, are illustrated. As shown, a smoke alarm 20 includes a housing 22. Although the housing 22 is illustrated as being generally circular in shape in FIG. 1, and generally rectangular or square with rounded corners in FIG. 2, it should be understood that a housing 22 having any suitable shape is contemplated herein. In an embodiment, the housing 22 includes a first upper housing portion 24 and a second, lower housing portion 26 that may be removably connected to the first housing portion 24. When the first and second housing portions 24, 26 are connected, the first and second housing portions 24, 26 enclose the controls and other components necessary for operation of the smoke alarm 20. As used herein, the terms "upper", "lower", and the like are in reference to the smoke alarm 20 in use as it is mounted on a surface, such as a ceiling in a building for example. Therefore, the upper housing portion 24 is typically closer to the ceiling than the lower housing portion 26, and the lower housing portion 26 is typically the portion of the smoke alarm 20 that will face downward toward the floor of the building. In some embodiments, the smoke alarm 20 may be mounted on a wall such that upper housing portion 24 is closer to the wall than the lower housing portion 26, and the lower housing portion 26 is typically the portion of the smoke alarm 20 that will face toward the area or interior space of the room to be monitored.

In an embodiment, the sidewalls of the housing 22, such as of the upper housing portion 24 and the lower housing portion 26 for example, are substantially solid. Accordingly, the sidewalls of the housing 22 do not include any openings through which the ambient atmosphere surrounding the smoke alarm 20 can flow into the interior of the housing 22.

The smoke alarm 20 further includes controls including a printed circuit board 30 disposed within interior of the housing 22. The controls may be located in the upper housing portion 24, the lower housing portion 26, or a combination thereof. The printed circuit board 30 includes the circuitry and/or components associated with at least one detection circuit (not shown) and at least one alarm circuit (not shown). In some embodiments, the smoke alarm 20 may be hardwired to a power source (not shown) located within the building or area where the smoke alarm 20 is mounted, remote from the smoke alarm 20. In such embodiments, the printed circuit board 30 may be directly or indirectly connected to the power source.

Figure 5:
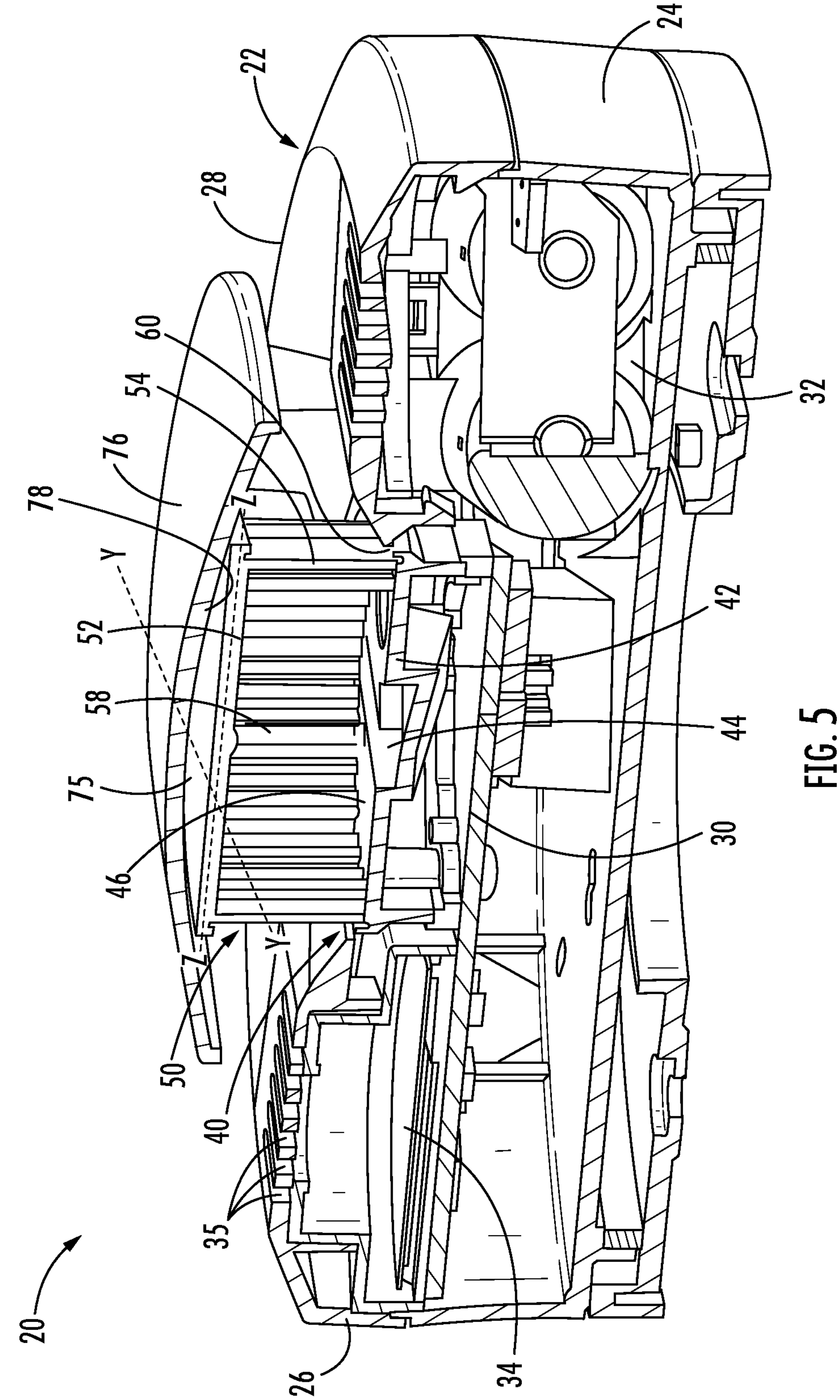
FIG. 5 is a cross-sectional view of the smoke alarm of FIG. 3A taken along line 5-5 according to an embodiment.

In an embodiment, the smoke alarm 20 includes a compartment 32 for receiving one or more batteries sufficient to provide the power necessary to operate the smoke alarm 20 for an extended period of time. In an embodiment, the power provided by the batteries may be the sole source of power used to operate the smoke alarm 20. However, in other embodiments, the battery power may be supplemental to the remote power source, for example in the event of a failure or loss of power at the power source. As best shown in FIG. 5, a sound generation mechanism 34, such as a speaker for example, may be mounted within the interior of the housing 22 and connected to the printed circuit board 30. The sound generation mechanism 34 is operable to receive power from the printed circuit board 30 to generate a noise in response to detection of a condition. In the illustrated, non-limiting embodiment, one or more openings 35 are formed in the lower housing portion 26 of the housing 22 at a location near or adjacent to the sound generation mechanism 34.

The smoke alarm 20 additionally includes one or more components that define an optical chamber assembly 40 within the interior of the housing 22. The optical chamber assembly 40 is generally in fluid communication with the area surrounding the smoke alarm 20 and is thus receptive of ambient materials. The ambient materials may include air as well as smoke and non-smoke particles that are carried by the air.

Although not shown, the optical chamber assembly 40 includes at least one light source, such as a light emitting diode for example. The one or more light sources individually, or in combination, may be configured to emit light at a plurality of different wavelengths, such as a first wavelength within the visible spectrum, and a second wavelength outside of the visible spectrum. The optical chamber assembly 40 additionally includes at least one light receiver (not shown). The light receiver is configured to receive light that is emitted by the at least one light source and that is then reflected from a chamber (to be described in more detail below) of the optical chamber assembly 40 by the ambient materials contained therein toward the light receiver along a light receiving axis of the light receiver. The light receiver may be provided as any suitable photoelectric light receiving element and is configured to generate an output electric signal in accordance with light being received. In embodiments including a plurality of light sources, one or more of the plurality of light sources may be arranged at a different emitting angle relative to the light receiver than another of the light sources.

With continued reference to FIG. 5, the optical chamber assembly 40 may include a light cover 42 having at least one opening 44 formed therein associated with each of the light sources and light receivers. For example, the openings 44 may be substantially aligned therewith such that the at least one light device is in optical communication with an area disposed adjacent the upper surface 46 of the light cover 42 via the openings 44.

The optical chamber assembly 40 additionally includes an optical cover 50, for example mounted in overlapping arrangement with the light cover 42. In an embodiment, a contour of the optical cover 50 is generally complementary to the light cover 42. However, embodiments where the optical cover 50 has a shape different than the light cover 42 are also within the scope of the disclosure.

Figure 3A:
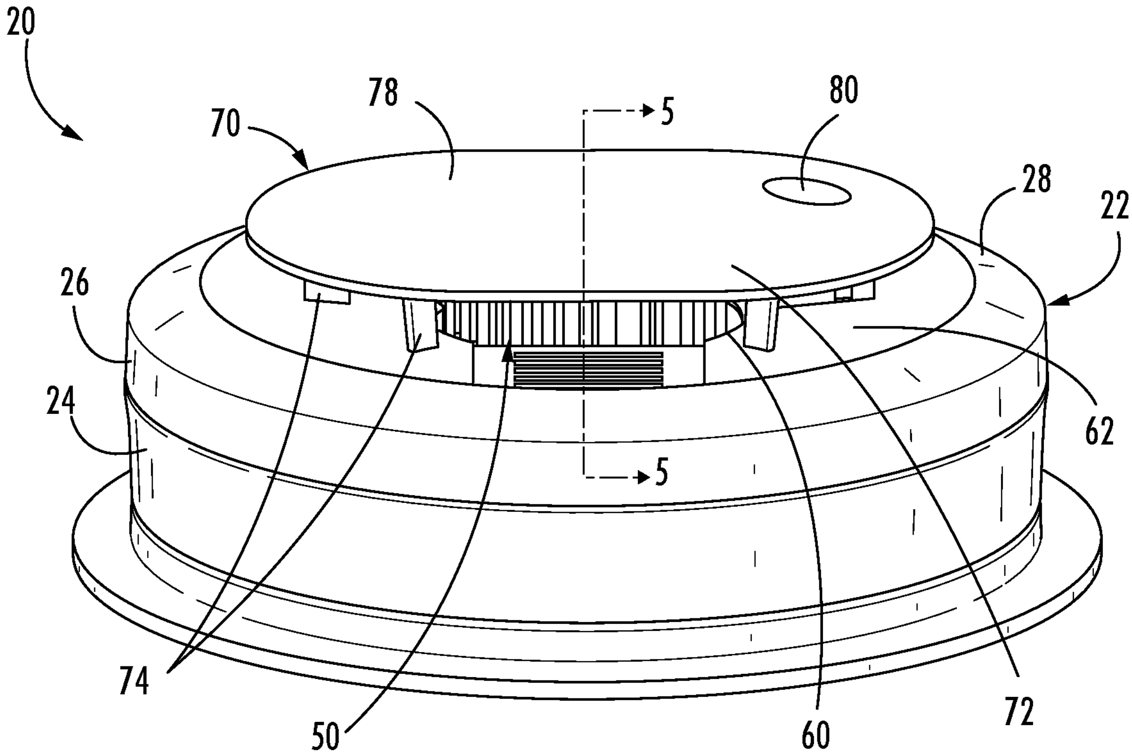
FIG. 3A is a perspective side view of an exemplary smoke alarm according to an embodiment.
Figure 3B:
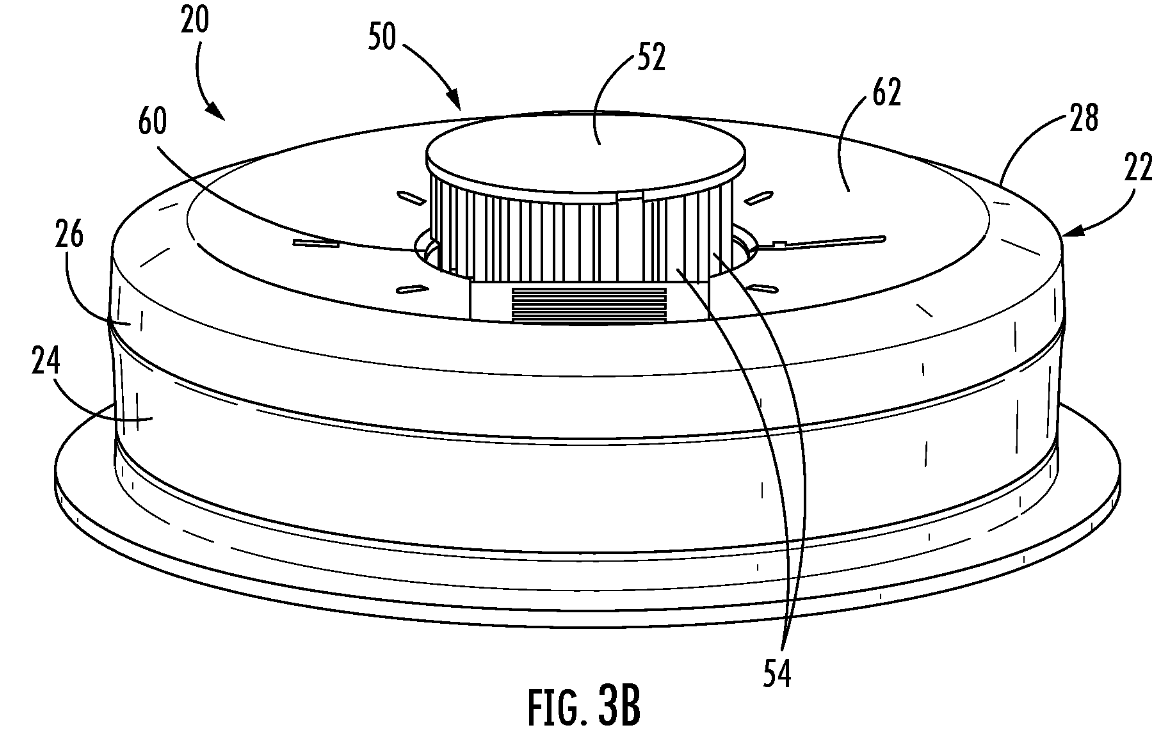
FIG. 3B is a perspective side view of the smoke alarm of FIG. 3A with the shield removed according to an embodiment.
Figure 6:
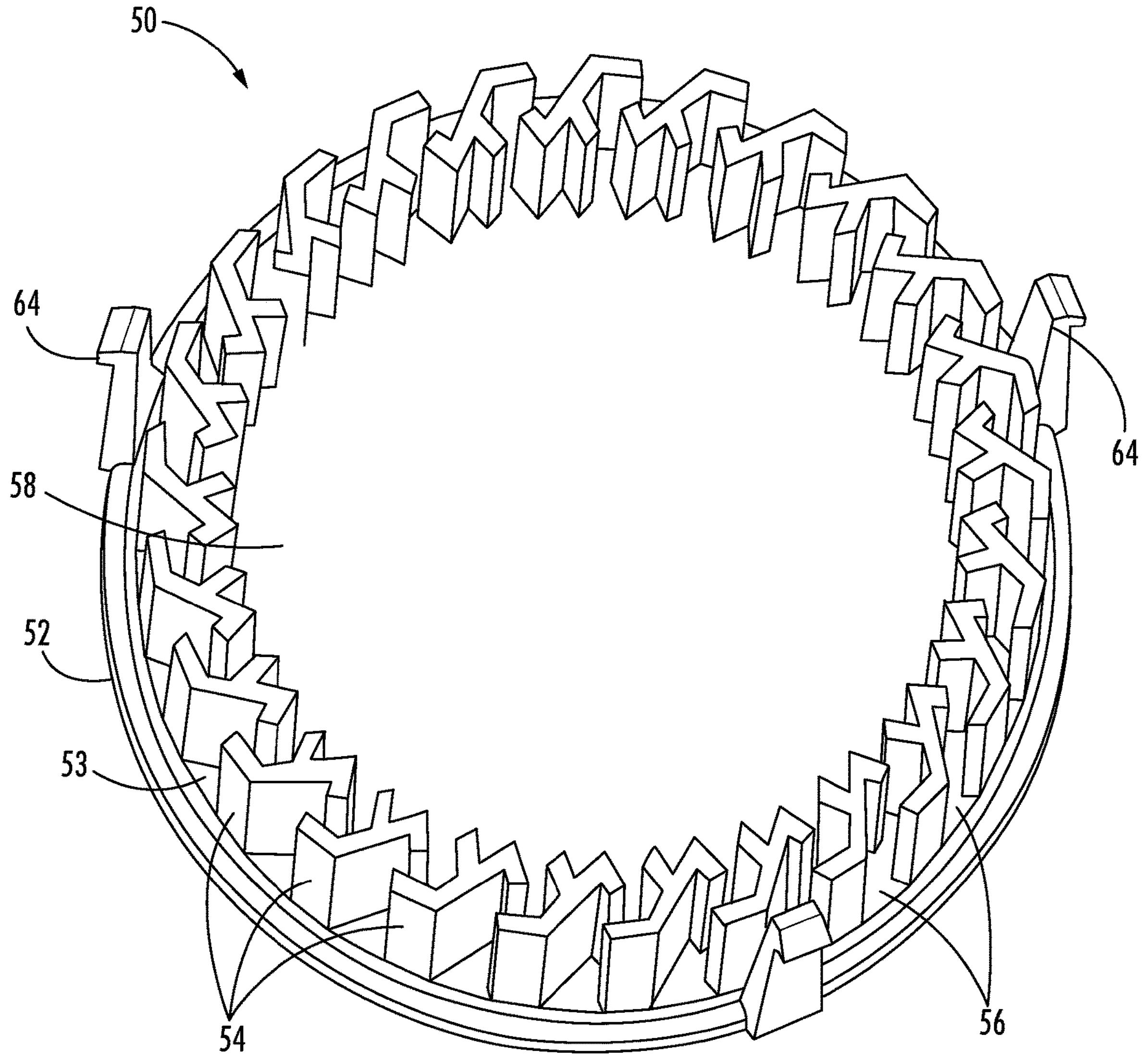
FIG. 6 is a perspective view of an exemplary optical cover of a smoke alarm according to an embodiment.

With reference to FIGS. 3B, 5, and 6, the optical cover 50 may include an end piece 52 and a plurality of individual side members 54 connected to and arranged at an angle relative to a surface 53 of the end piece 52. In the illustrated, non-limiting embodiment, each of the plurality of side members 54 is substantially identical in shape and the side members 54 are spaced equidistantly about the periphery of the end piece 52. The side members 54 may be generally labyrinth-like in shape and are offset from one another by a distance such that a small clearance 56 is formed between adjacent side members 54. Each of these clearances 56 allows ambient air and any particles trapped therein to flow from outside the optical cover 50 into the interior chamber 58 of the optical cover 50 defined between the plurality of side members 54 and the adjacent surface 46 of the light cover 42. The labyrinth arrangement is intended to allow a flow of ambient air through the side members 54 while maximizing the blockage of stray light by limiting any direct light path to the photodiode from outside sources.

An opening 60 is formed in the housing 22, such as in the surface 28 of the lower housing portion 26 configured to face toward an interior of a room for example. As shown, the opening 60 may be formed at a general center of the housing 22. The surface 28 of the housing 22 in which the opening 60 is formed may have a non-planar configuration. For example, in an embodiment, at least a portion of the surface 28 is configured to curve or slope inwardly in the direction of the opening 60. As a result, a groove or recess 62 may be formed in the surface 28 of the housing 22 directly adjacent to the opening 60.

In the illustrated, non-limiting embodiment, a portion of the optical cover 50 is arranged within and/or extends through the opening 60 into an interior of the housing 22. The optical cover 50 may be configured to removably affix to the light cover 42, such as via a plurality of resilient tabs 64 (see FIG. 6) for example. However, embodiments where the optical cover 50 connects to a portion of the housing 22, or alternatively, to another component within the interior of the housing 22 are also within the scope of the disclosure.

As shown, the end piece 52 of the optical cover 50 is offset from the adjacent surface 28 of the housing 22 by a distance such that a substantial entirety, or at least a portion of each of the side members 54 is also arranged external to the housing 22. Accordingly, the chamber 58 defined by the optical cover 50 is arranged at least partially, and in some embodiments substantially forward of or external to the housing 22 such that the chamber 58 is offset from the housing 22. As described herein, air and smoke entrained therein is typically provided to the chamber 58 via the passageways or clearances 56 defined between adjacent side members 54 of the optical cover 50. In an embodiment, the passageways 56 formed in the optical cover 50 provide the only or single smoke entry location of the optical chamber assembly 40 and the smoke alarm 20.

Although not shown, a screen or other similar component may be configured to prevent bugs (which may interfere with the proper function of the smoke alarm 20) from entering the chamber defined between the side members 54 and the upper surface 46 of the light cover 42. In an embodiment, the screen is wrapped about an exterior surface of the plurality of side members 54. However, in other embodiments, the screen may be affixed to an interior surface of the plurality of side members 54.

A shield 70 may be connected to the housing 22, such as to the lower housing portion 26 facing toward an interior of a room for example. The shield 70 may be removably or permanently connected thereto. In the illustrated, non-limiting embodiment, the shield 70 includes a body 72 and a plurality of supports 74 extending from the body 72. The plurality of supports 74 may be configured to form a snap-fit connection with the housing 22 and/or the optical cover 50 to secure the shield 70 to the housing 22. However, in embodiments where the shield 70 is removable, the shield 70 may be configured to attach to the housing 22 or optical cover 50 via any suitable coupling mechanism. Further, in embodiments where the shield 70 is connected to the housing 22 or optical cover 50 via a plurality of supports 74, the supports 74 may be configured (i.e. sized and shaped) to minimize interference with a flow of ambient materials towards the smoke entry location formed at the sidewalls 54 of the optical cover 50.

Figure 2:
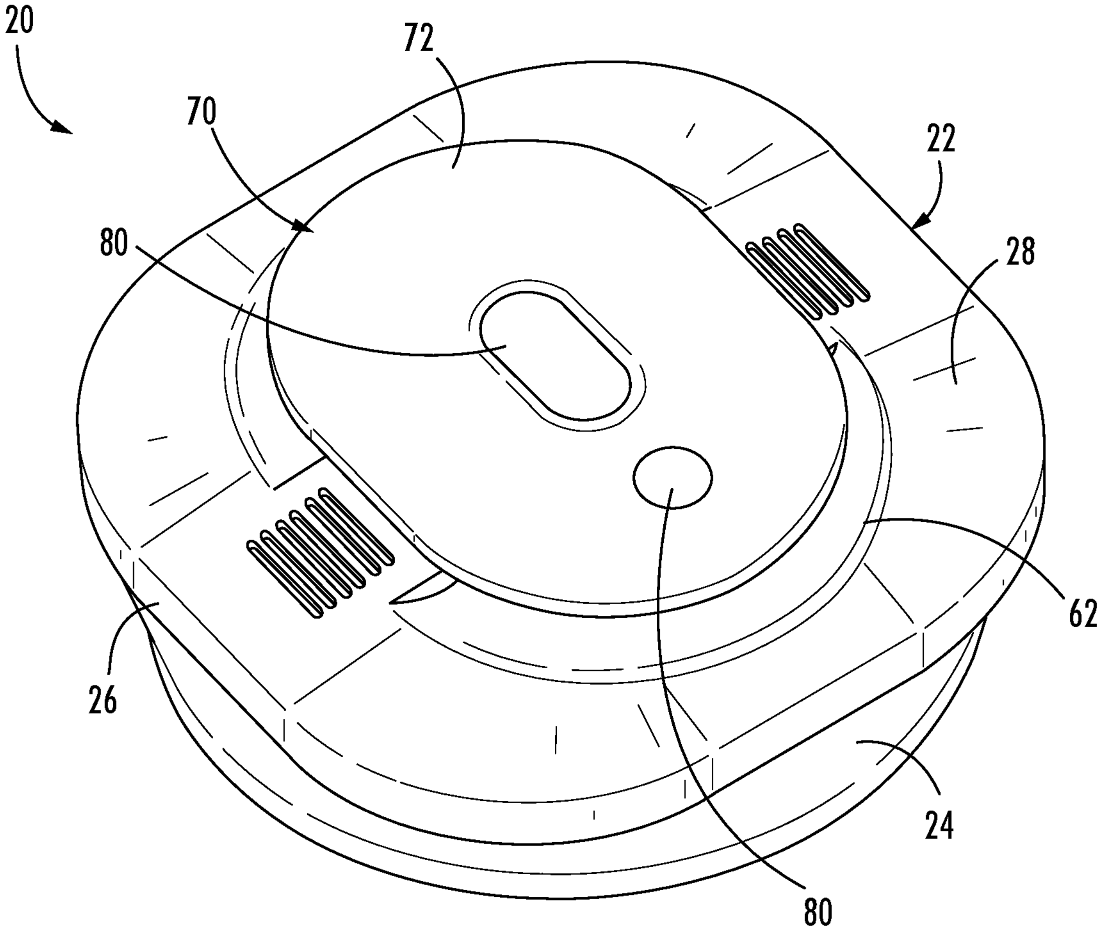
FIG. 2 is a perspective view of another exemplary smoke alarm according to an embodiment.

In an embodiment, the smoke alarm 20 includes one or more actuatable mechanisms 80, such as a button for example, operably coupled to the printed circuit board 30. As best shown in FIG. 2, at least one actuatable mechanism 80 may be formed in the shield 70. However, embodiments of the smoke alarm 20 where an actuatable mechanism 80 is formed in the housing 22, such as the lower housing portion 26 are also contemplated herein. The actuatable mechanism 80 may be configured to perform one or more functions of the smoke alarm 20 when actuated. Examples of operations performed via the actuatable mechanism 80 include, but are not limited to, a press to test function, a smoke alarm "hush", a low battery "hush", and end of life "hush," radio frequency enrollment of additional smoke alarms 20 such as in a detection system including a plurality of smoke alarms configured to communicate with one another wirelessly, and to reset the unit once removed from its packaging.

The shield 70 is arranged adjacent to the smoke entry point of the smoke alarm 20. As shown, the shield 70 may be positioned in axial alignment or overlapping arrangement with the end piece 52 of the optical cover 50. The body 72 of the shield 70 may be offset from the end piece 52 of the optical cover 50 such that a small clearance 75 is formed therebetween. However, embodiments, where at least a portion of the body 72 is arranged in contact the end piece 52 of the optical cover 50 are also contemplated herein.

Figure 4:
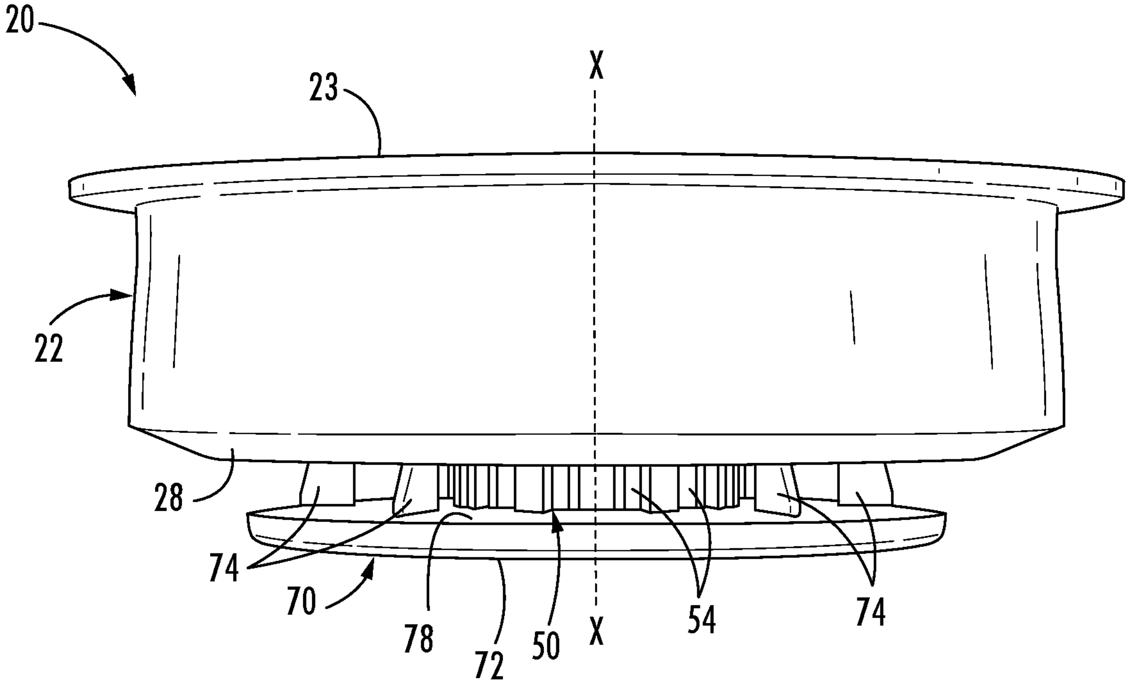
FIG. 4 is a side view of an exemplary smoke alarm in a ceiling-mounted configuration according to an embodiment.
Figure 7:
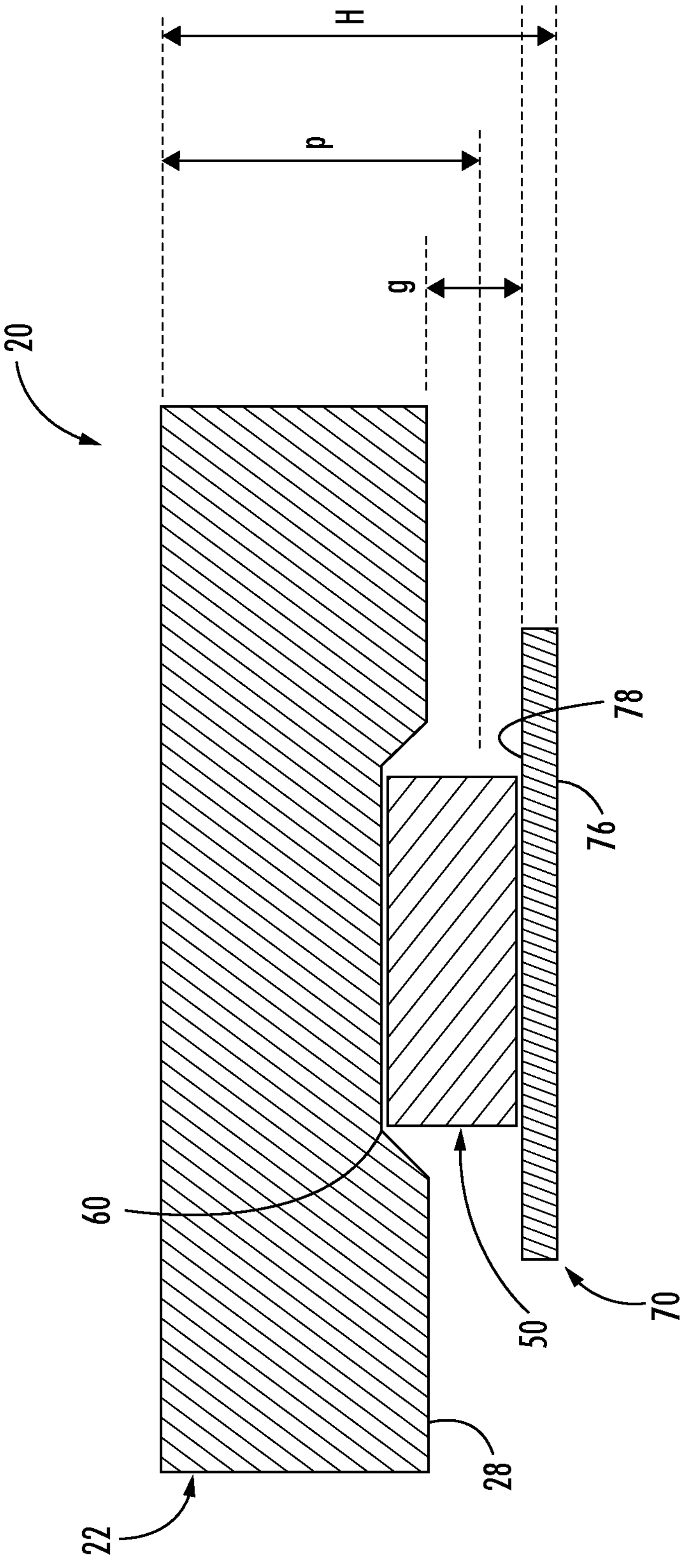
FIG. 7 is a schematic diagram of a smoke alarm according to an embodiment.

With continued reference to FIGS. 4-6 and further reference to FIG. 7, the overall height of the smoke alarm 20 extending between an end of the housing 22 and an outer surface 76 of the shield 70 is represented by H. Similarly, the clearance between the inner surface 78 of the shield 70 and the surface 28 of the housing 22 closest to the shield 70, also referred to herein as the smoke entry clearance gap, is represented by g. In an embodiment, the smoke entry clearance gap g, is between about 5 mm and about 12 mm, and in some embodiments, between about 5 mm and about 10 mm. The distance between the end of the housing 22 and a centerline of the smoke entry gap is represented by p. In an embodiment, the ratio of the distance of the smoke entry gap centerline p to the overall smoke alarm height H is between about 0.7 and about 0.9.

In the illustrated, non-limiting embodiment, the body 72 of the shield 70 has at least one dimension that is larger than a corresponding dimension of the opening 60 and the optical cover 50. For example, both a length and a width of the shield 70 are greater than the respective length and width of the opening 60 and optical cover 50. The shape of the shield 70 may be similar, or alternatively, may be different than the overall shape of the housing 22. In the illustrated, non-limiting embodiment of FIGS. 1 and 2, the body 72 is generally oval or elliptical in shape, regardless of the shape of the housing 22; however, a body 72 having any suitable shape is within the scope of the disclosure.

In an embodiment, the body 72 of the shield 70 may have a generally planar configuration. However, in another embodiment, best shown in FIG. 5, the body 72 of the shield 70 has a non-planar configuration extending in at least one direction. As shown, the body 72 of the shield 70 is curved about a first axis Y extending substantially perpendicular to the axis X extending through the optical chamber assembly 40 and the optical cover 50. Alternatively, or in addition, the body 72 may be curved about a second axis Z, the second axis being oriented substantially perpendicular to the axis X and to the first axis Y. As a result of this curvature in one or two directions, the body 72 of the shield 70 may have a generally convex outer surface 76 and/or a generally concave inner surface 78. This curvature of the inner surface 78 is configured to guide or facilitate the movement of ambient materials towards the side members 54 of the optical cover 50, and may result in a more consistent flow into the internal chamber 58. In an embodiment, the inner surface 78 of the shield 70 cooperates with the groove 62 formed in the surface 28 of the housing 22 to provide a flow path for air and smoke into the internal chamber 58.

Figure 8:
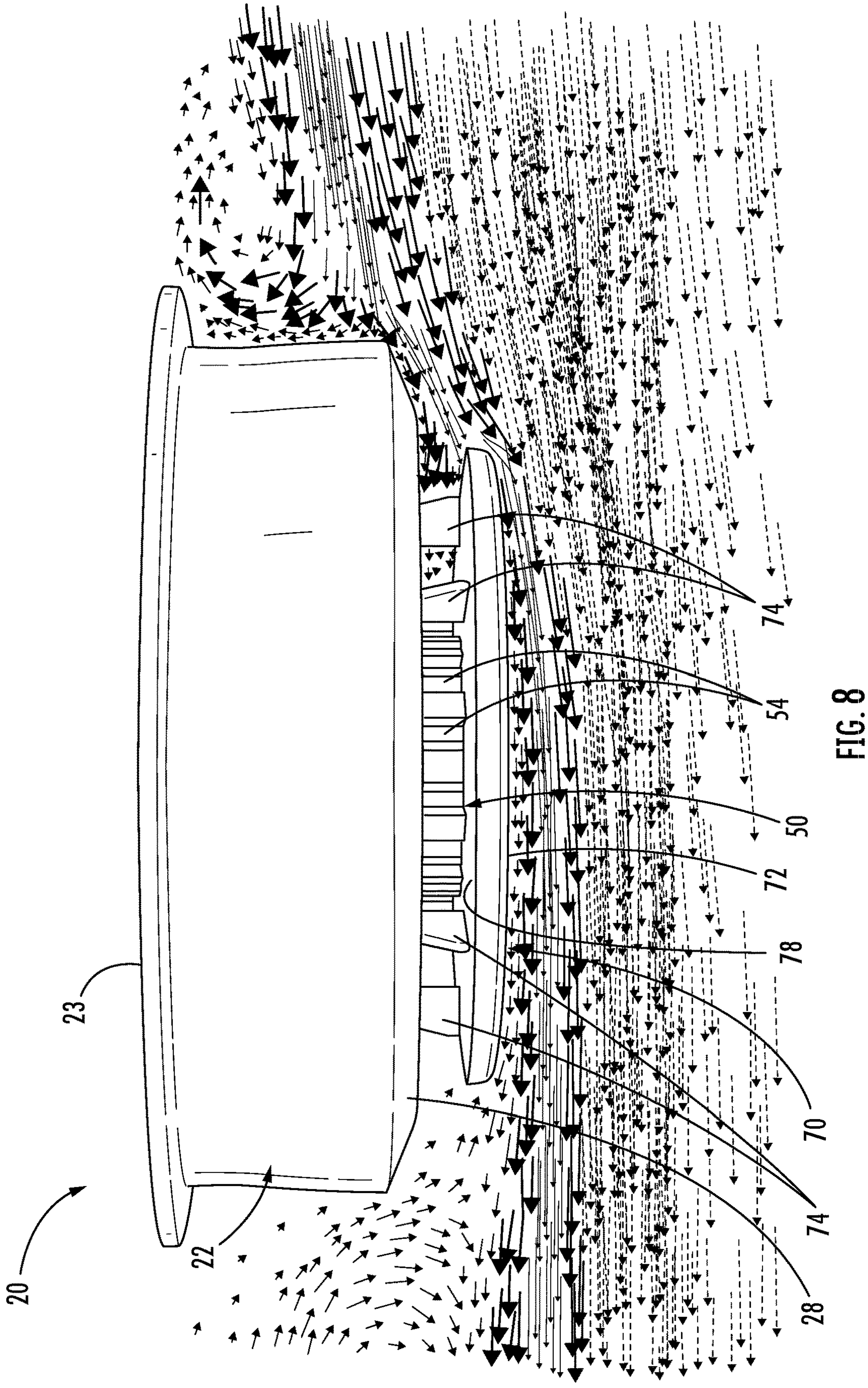
FIG. 8 is a computational fluid dynamics analysis of a fluid flow surrounding a smoke alarm according to an embodiment.

With reference now to FIG. 8, a computational fluid dynamics analysis of a fluid flow adjacent to a smoke alarm 20 is illustrated. As shown, the chamber 58 is offset from and therefore fluidly remote from the wall boundary layer. Because the sidewalls of the housing 22 are substantially solid and have no openings formed therein, the flow surrounding the sides of the housing 22 is diverted towards the clearance formed between the shield 70 and the recess 62 formed in the surface 28 of the housing 22.

A smoke alarm 20 as described herein provides optimum smoke entry into the chamber 58 for evaluation by the optical chamber assembly 40. This allows the electronics and firmware of smoke alarm 20 to determine the presence of smoke and/or fire conditions more efficiently.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A smoke alarm comprising:

a housing including an upper housing portion and a lower housing portion, the upper housing portion and the lower housing portion, in combination, define a generally hollow interior of the housing;

a printed circuit board arranged within the interior of the housing;

an optical chamber assembly connected to the printed circuit board, the optical chamber assembly including an optical cover having an interior chamber and at least one smoke entry location, the optical cover protruding beyond an exterior surface of the lower housing portion such that a substantial entirety of the interior chamber of the optical cover is external to the housing; and at least one light device for evaluating particles within the interior chamber of the optical cover.

2. The smoke alarm of claim 1, wherein the at least one smoke entry location is a single smoke entry location.

3. The smoke alarm of claim 2, wherein the single smoke entry location being formed about a periphery of the optical cover.

4. The smoke alarm of claim 1, wherein the optical cover further comprises an end piece and a plurality of side members extending from the end piece, wherein a portion of the plurality of side members arranged external to the housing forms the single smoke entry location.

5. The smoke alarm of claim 1, wherein the at least one light device is mounted external to the internal chamber.

6. The smoke alarm of claim 1, further comprising a shield having a body, the body being offset from the housing, wherein the shield is mounted in overlapping arrangement with the smoke entry location.

7. The smoke alarm of claim 6, wherein at least one dimension of the body is larger than a corresponding dimension of the optical cover.

8. The smoke alarm of claim 6, wherein the body is curved about a first axis, the first axis extending substantially perpendicular to an axis extending through the optical chamber assembly and the optical cover.

9. The smoke alarm of claim 8, wherein the body is curved about a second axis, the second axis extending substantially perpendicular to the first axis.

10. The smoke alarm of claim 6, wherein the shield further comprises a plurality of supports extending from the body and connected to the housing, wherein a configuration of the plurality of supports is selected to minimize interference with a flow toward the smoke entry location.

11. The smoke alarm of claim 1, wherein a groove is formed in a surface of the housing facing an area to be monitored.

12. The smoke alarm of claim 1, wherein the housing has a substantially solid sidewall.

* * * * *